United States Patent [19]
Abe et al.

[11] Patent Number: 5,734,436
[45] Date of Patent: Mar. 31, 1998

[54] TELEVISION RECEIVING SET HAVING TEXT DISPLAYING FEATURE

[75] Inventors: Hirotoshi Abe, Kumagaya; Michiru Narita, Fukaya, both of Japan

[73] Assignee: Kabushiki Kaisha Toshiba, Kawasaki, Japan

[21] Appl. No.: 720,328

[22] Filed: Sep. 27, 1996

[30] Foreign Application Priority Data

Sep. 27, 1995 [JP] Japan .................................. 7-249535

[51] Int. Cl.⁶ .................................................. H04N 5/445
[52] U.S. Cl. ........................ 348/564; 348/565; 348/569; 348/589
[58] Field of Search .................................. 348/503, 504, 348/505, 568, 569, 588, 589, 600, 468, 903, 904, 913; H04N 5/445, 5/45

[56] References Cited

U.S. PATENT DOCUMENTS

| | | |
|---|---|---|
| 5,298,995 | 3/1994 | Monta et al. . |
| 5,363,143 | 11/1994 | Duffield ............ 348/564 |
| 5,420,642 | 5/1995 | Baek ............ 348/565 |
| 5,500,680 | 3/1996 | Lee . |

FOREIGN PATENT DOCUMENTS

| | | |
|---|---|---|
| 625852 | 11/1994 | European Pat. Off. . |
| 656727 | 6/1995 | European Pat. Off. . |
| 660602 | 6/1995 | European Pat. Off. . |
| 3-201880 | 9/1991 | Japan . |
| 2165719 | 4/1986 | United Kingdom . |
| 2262407 | 6/1993 | United Kingdom . |

OTHER PUBLICATIONS

Hirotoshi Abe et al, "Double-Window TV Displays Full-Color Images Side by Side", Journal of Electronic Engineering, 31 (1994) Oct., No. 334, Tokyo, JP.

*Primary Examiner*—Sherrie Hsia
*Attorney, Agent, or Firm*—Cushman Darby & Cushman IP Group of Pillsbury Madison & Sutro LLP

[57] ABSTRACT

The signals received by tuners are processed respectively by video processing circuits and fed to a synthesizing circuit by way of compression circuits so that the images of the signals are displayed respectively on left and right side sections of the screen of a display unit. The characters and graphics from a teletext/data transmission decoder are synthetically combined with the portions of the images of the video signals for blank zones of the screen by the synthesizing circuit. The characters and graphics transmitted through a data channel are displayed clearly to the viewer by an ingenious technique devised for displaying characters and graphics of a supplementary program.

12 Claims, 11 Drawing Sheets

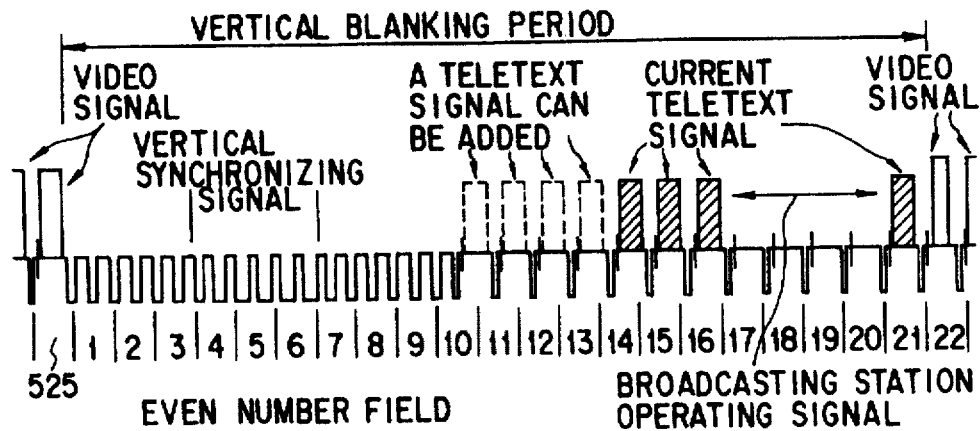
F I G. 2A
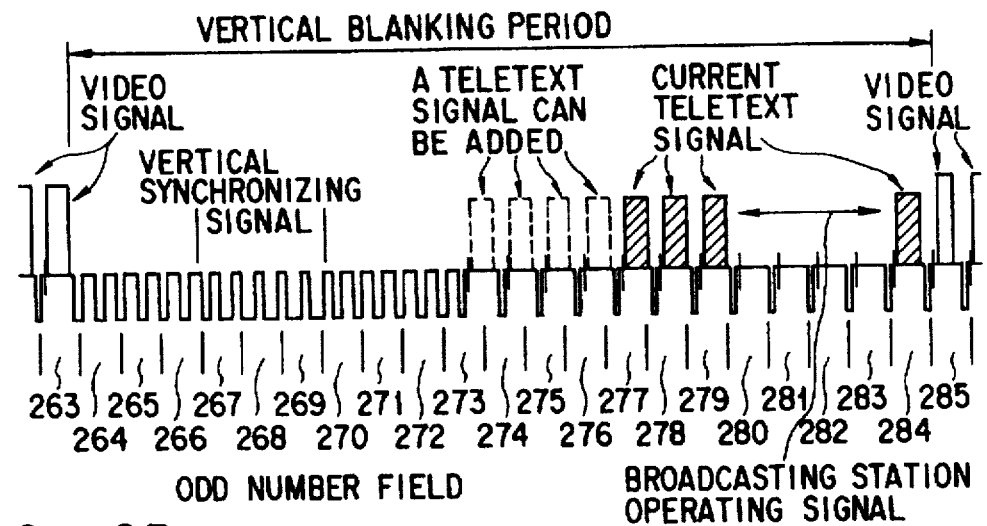
F I G. 2B
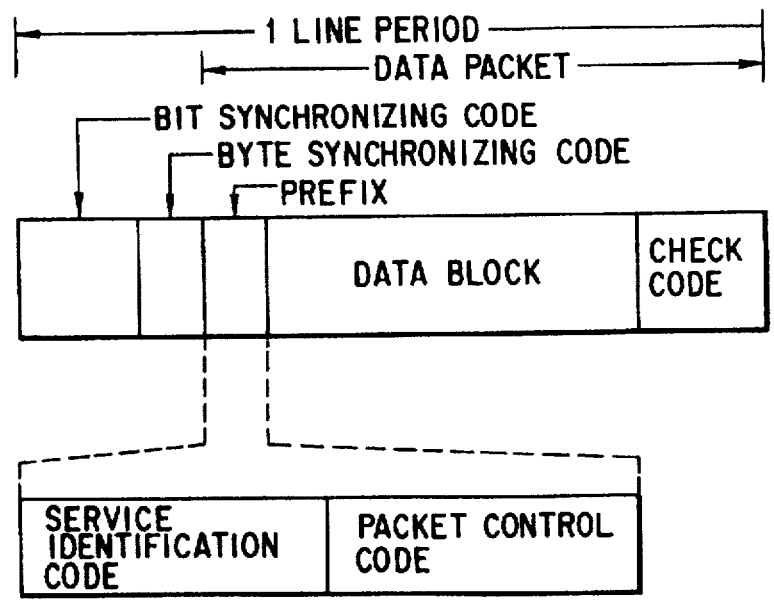
F I G. 3

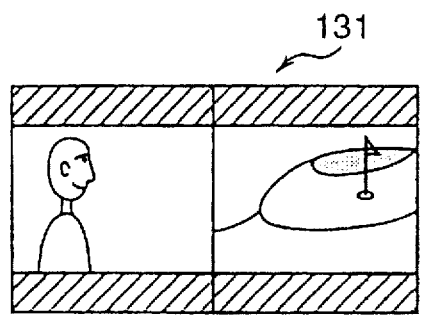
FIG. 7A
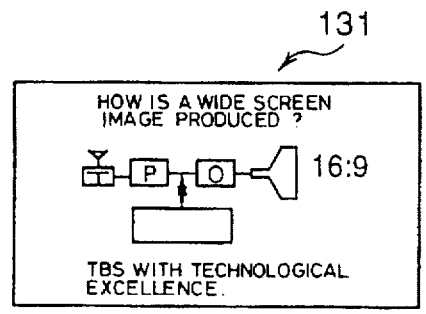
FIG. 7B
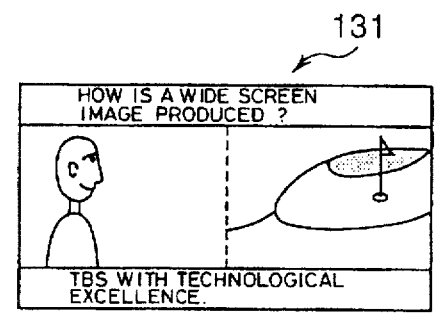
FIG. 7C
FIG. 8A
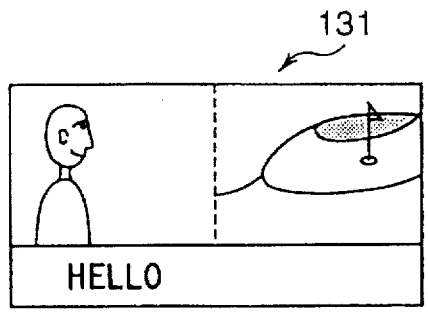
FIG. 8B
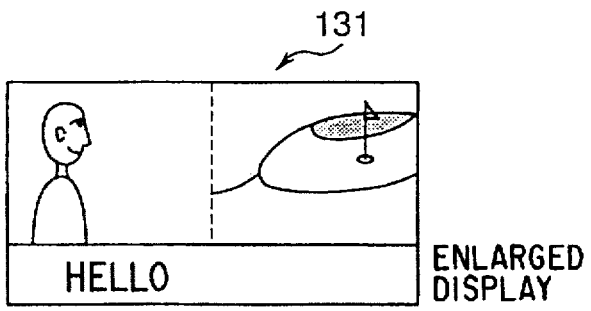
ENLARGED DISPLAY
FIG. 8C
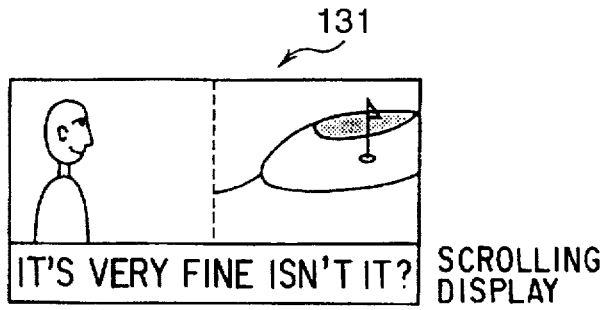
SCROLLING DISPLAY

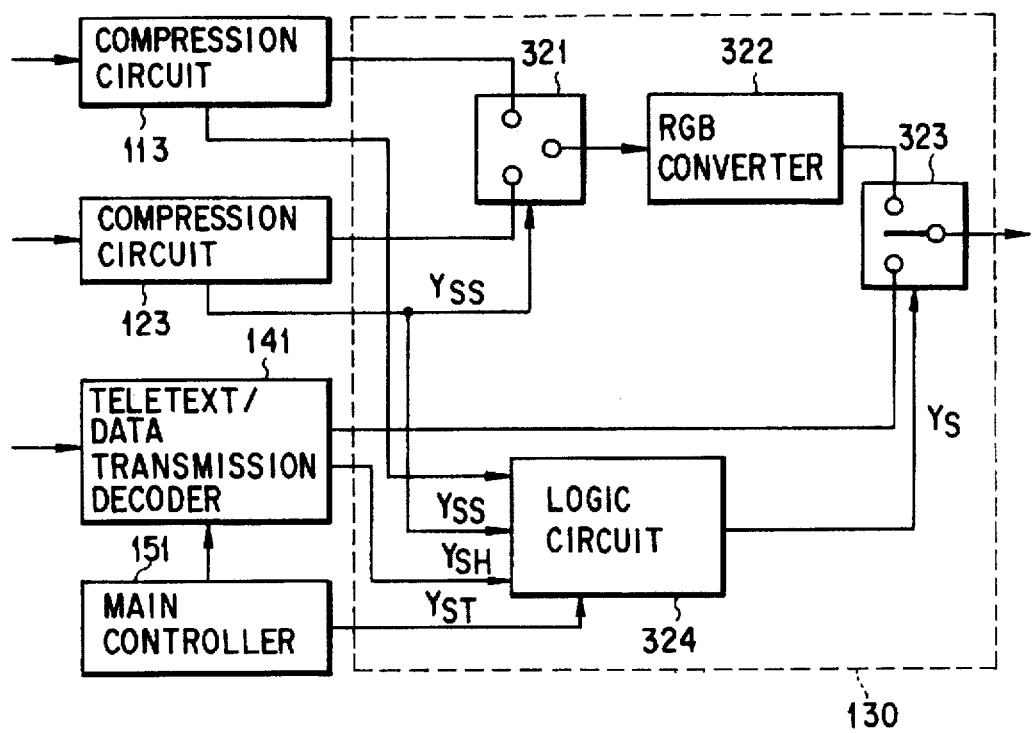
F I G. 9
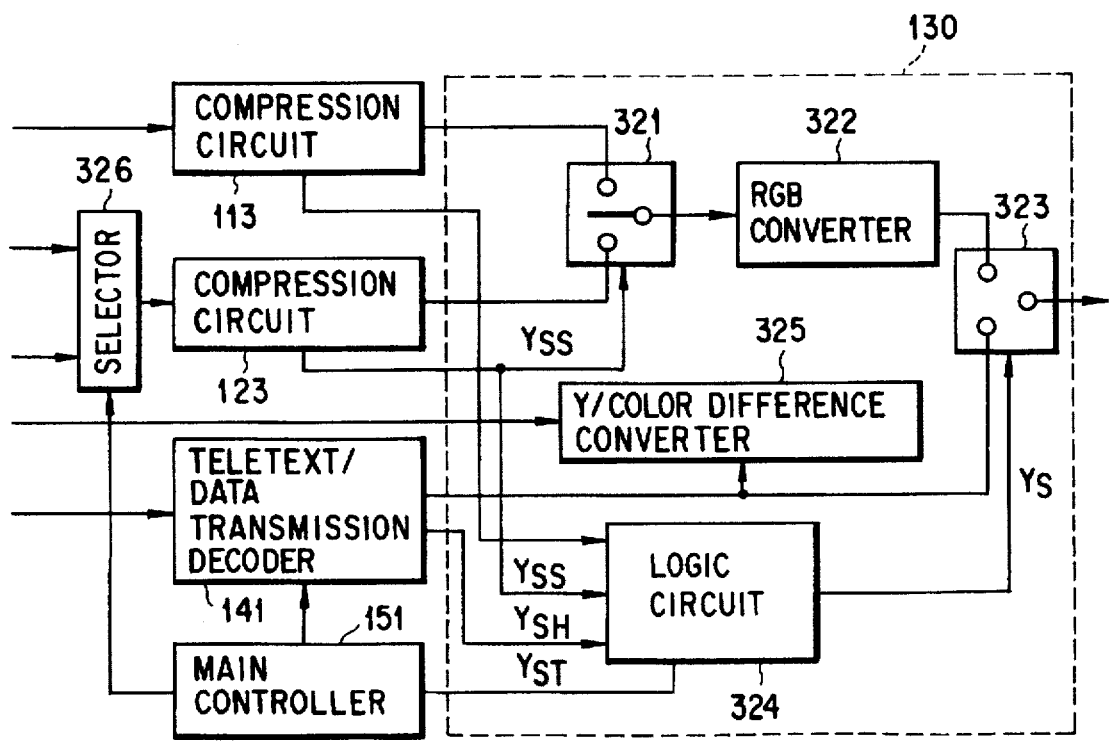
F I G. 11

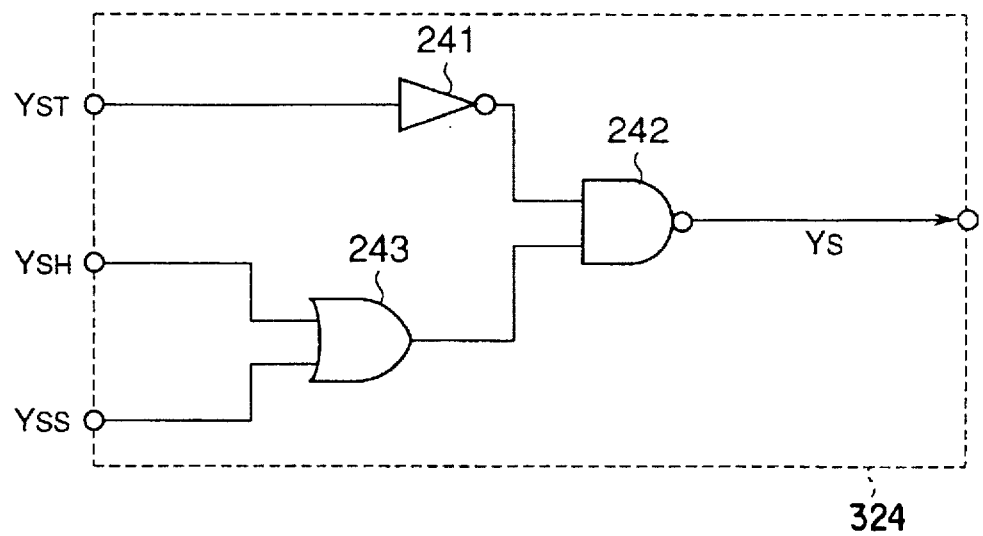
F I G. 10A
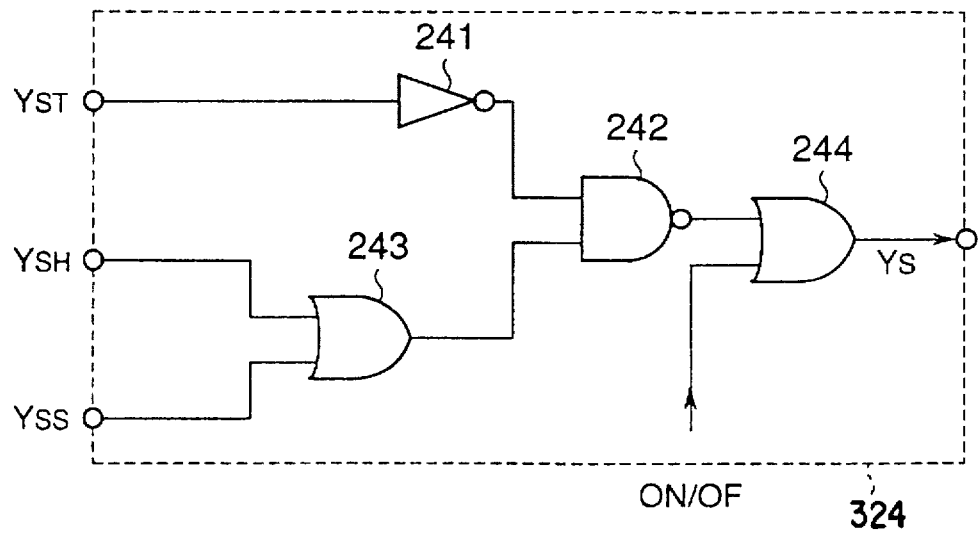
F I G. 10B

TELEVISION RECEIVING SET HAVING TEXT DISPLAYING FEATURE

BACKGROUND OF THE INVENTION

1. Field of the Invention

This invention relates to a television receiving set having a text displaying feature and, more particularly, it relates to a technology of effectively utilizing the display screen of a television receiving set for displaying characters and graphics received as electric signals contained in ordinary television signals.

2. Description of the Related Art

The multiplexed text broadcasting, or teletext, is a currently available television broadcasting service for transmitting signals for characters and graphics along with ordinary television signals through a single transmission channel. It is used currently for programs of various categories including news, weather forecast, traffic information, tourism information and television shopping. In some programs, teletext is used for television polling.

The teletext is unilateral in the sense that information is offered only from the broadcasting station to the viewers. In the case of a telephone shopping program where the program provider transmits shopping information utilizing teletext, each viewer may take a note of the code of each commodity he or she wants to buy, the telephone number of the mail-order firm and other pieces of information displayed on the screen and subsequently dial the telephone number for ordering by referring to the note. In the case of a program for television polling, viewers will also take a note of the telephone numbers to be used for the poll and subsequently dial not-busy one of the telephone numbers by referring to the note. Then, in either case, there arises a problem that viewers can dial a wrong number because of a wrong dialing operation, because a wrong number has been memoed or for some other reason.

Thus, firstly, since the teletext is unilateral in the sense that information is offered only from the broadcasting station, who then has to wait for calls from viewers, it will take a long response time. Secondly, if it entails telephone calls, it intrinsically involves wrong calls that can take place with a certain level of probability.

In order to bypass the above identified problems, there has been proposed a technique with which the broadcasting station transmits computer program data to each computer receiving set having the teletext feature and comprising a means for executing a computer program by using the transmitted data so that the computer program executing means automatically dials the transmitted telephone number to make a call when the viewer keys in the command for such a call and transmits the data keyed in also by the viewer. With such an arrangement, the probability of dialing a wrong number is reduced to nil and the response time is significantly curtailed.

In the following description, the program with which computer program data and supplementary data on characters and graphics explaining the proper television program will be referred to as supplementary program and the computer program will be referred to as script.

Since most of the existing circuit block (teletext transmission decoder) for receiving and processing teletext programs can be shared by the circuit block (data transmission decoder) for receiving and processing supplementary programs, the combination of a teletext transmission decoder and a data transmission decoder can be dimensionally reduced when they are designed in the form of a single circuit clock that is operated selectively either in a teletext program mode or in a supplementary program mode.

When a circuit block adapted to both supplementary programs and teletext programs is operated in the supplementary program mode, it is of vital importance that the viewer can visually ascertain if the output of the circuit is being displayed or not in order to avoid faulty operation on the part of the viewer.

Television receiving sets having an image memory and a multi-image displaying feature are also currently available. Some television receiving sets are provided with a feature of splitting the screen into two sections and simultaneously displaying two television images received through two different television channels on the respective sections.

On the other hand, with currently available EDTV2 (extended definition television 2) system television receiving sets that are compatible with the NTSC system, the screen is adapted both to the aspect ratio of 4:3 for displaying ordinary images of the NTSC system and to that of 16:9 for displaying wide images of the EDTV2 system by producing upper and lower blank zones on the screen, signals for the blank zones being multiplexed with signals for improving the definition of the screen.

A supplementary program is more often than not displayed on the same screen simultaneously with the proper program that is currently being received. However, if characters and graphics of the supplementary program is laid on the image of the proper program or, if one of the two sections is dedicated to the supplementary program when the screen is designed to be split into two sections to display two images simultaneously, the viewer may be confused in discriminating the supplementary program from the proper program. Additionally, characters and graphics of the supplementary program may be hardly recognizable depending on the background image on which they are shown.

SUMMARY OF THE INVENTION

As described above, currently, some television receiving sets are provided with the feature of splitting the screen into two or more than two sections to display different programs transmitted through different channels while some are provided with the feature of producing upper and lower blank zones to display images for a wide screen. When a supplementary program is displayed on a proper program on a superimposition basis, characters and graphics of the supplementary program can be hardly discernible from the proper program depending on the background image or the positions of the superimposed elements to make it difficult to discriminate the supplementary program from the proper program.

In view of the above problems, it is therefore the object of the present invention to provide a television receiving set having a text displaying feature that is designed to display characters and graphics of supplementary programs in a specific way to display clearly discernible characters and graphics from signals transmitted through a data channel.

According to the invention, characters and graphics obtained by decoding teletext signals and data transmission signals by means of a teletext/data transmission decoder are displayed in the blank zones of the display screen of a television receiving set according to the invention.

In the case of television signals in the letter box format, either the upper or lower blank zone is moved to the bottom or the top of the screen, whichever appropriate, to produce a single and wide bottom or top blank zone so that characters and graphics may become clearly visible.

Additionally, when the screen is split into two sections in order to display two different images, one of the sections of the screen can be used to display characters and graphics so that may of them may be displayed collectively.

Finally, characters and graphics on the television screen can be enlarged to make them clearly visible.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 2A and 2B are graphs illustrating a signaling system for transmitting teletext and data transmission signals to which this invention is applicable, where FIG. 2A illustrates even number fields of a television signal and FIG. 2B illustrates odd number fields;

FIG. 3 is a schematic illustration of a data packet of teletext and data transmission signals to which this invention is applicable;

FIGS. 7A through 7C are views that can be displayed by the television receiving set of FIG. 5;

FIGS. 8A through 8C are the other views that can be displayed by the television receiving set of FIG. 5;

FIG. 9 is a block diagram of a synthesizing section 130 that can be used for the embodiment of FIG. 5;

FIGS. 10A and 10B show circuit diagrams that can be used for the logic circuit of FIG. 9;

FIG. 11 is a block diagram of an alternative synthesizing section 130 that can be used for the embodiment of FIG. 5;

DETAILED DESCRIPTION OF THE PREFERRED EMBODIMENTS

Now, the present invention will be described by referring to the accompanying drawings that illustrate preferred embodiments of the invention.

Figure 1:
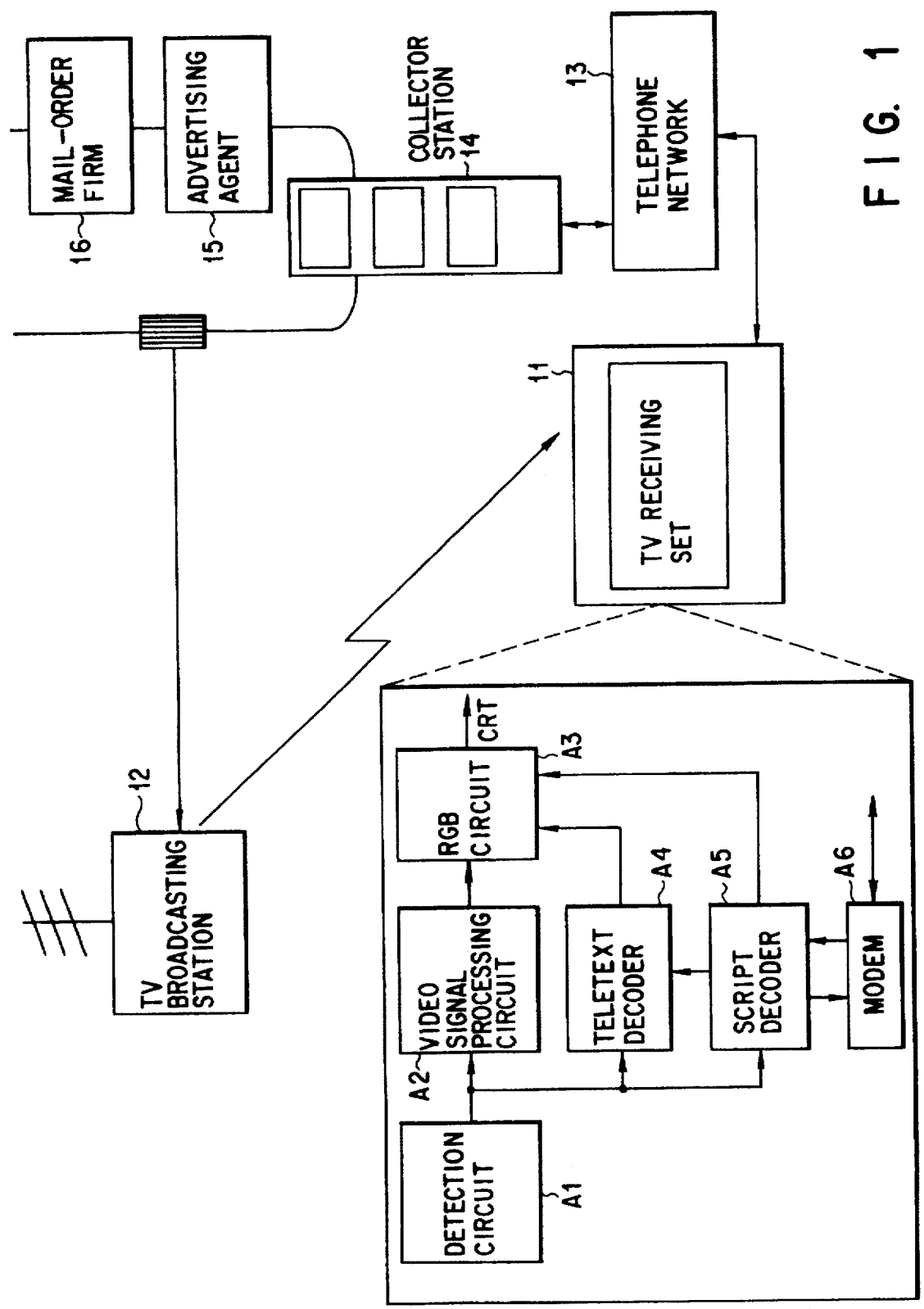
FIG. 1 is a block diagram of a transmission/ reception system for teletext and data transmission signals realized by applying this invention.

FIG. 1 is a block diagram of a bidirectional telecommunications system realized by utilizing a television broadcasting network and applying this invention. This system utilizes the existing teletext service feature of a television broadcasting network and a telephone network. An expanded upload data transmission service is realized by combining a television broadcasting network that is unidirectional and a telephone network to bring forth a bidirectional service system. More specifically, this system is realized by expanding the existing teletext service feature of a television broadcasting network by means of software. Thus, the proper television broadcasting service and teletext services are not affected if an a script is added to a TV program. Nor the proper functions of a TV receiving set will be affected by using an apparatus according to the invention with it.

The system of FIG. 1 is realized by establishing a network comprising a TV receiving set 11, a TV broadcasting station 12, a telephone network 13 and a collector station 14. The TV broadcasting station 12 transmits a script (computer program) including a supplementary program with a proper television program to realize a bidirectional service for the proper television program. Alternatively, the TV broadcasting station 12 may transmit the computer program repeatedly as an independent program within a predetermined time slot. A script is a sort of application program that defines the procedure for establishing a bidirectional telecommunications system. It is transmitted in vertical blanking intervals of TV signals.

The script is stored in a memory of the TV receiving set 11 for receiving TV signals and typically executed by a program executing device (script decoder) incorporated in said TV receiving set 11. The script decoder then displays on the TV screen a symbol mark (e.g., letter "i") indicating that the current program is accompanied by a supplementary program to notify the viewer about it. It starts executing the script to display supplementary data for the program when the viewer keys in a command.

The means for displaying a symbol mark (supplementary program mark) is unique to the system and will be described hereinafter along with its operation.

The responding operation of the viewer may be completed only within the TV receiving set 11 or the response of the viewer may be transmitted to the TV broadcasting station 12, advertising agent 15 or mail-order firm 16 by way of a local computer system (collector station 14) and the telephone network 13. The TV broadcasting station 12 can receive the responses from the viewers and reflect them on the current program on a real time basis. Alternatively, it may pick up desired data from the collector station 14 by way of the telephone network 13.

The TV receiving set 11 is provided with a script decoder A5 and a modem 6 for bidirectional telecommunications in addition to an ordinary TV reception circuit including a detection circuit A1, a video signal processing circuit A2, an RGB circuit A3 and a teletext decoder A4. The script decoder A5 picks up scripts from the TV signals being transmitted from the TV broadcasting station 12 and execute them to realize bidirectional telecommunications.

The viewer operates the TV remote control to respond the program and send upload data. As the viewer keys in his or her response, the modem 6 contained in the TV receiving set 11 automatically dials the specified telephone number to connect itself to the collector station 14 by way of the telephone network 13 so that consequently the response of the viewer is conveyed to the collector station 14. The upload data (response data) are transmitted instantly if the program wants them on a real time basis. If not, they may be transmitted during the night when the lines are less busy.

The viewer does not have to dial him- or herself the specified telephone number because the modem 6 added to the TV receiving set 11 has an automatic dialing feature. The specified telephone number is contained in the script transmitted to the viewer from the TV broadcasting station 12 for each supplementary program. More than one telephone numbers may be contained in a script so that the viewer may select an appropriate number.

The script decoder A5 is a processor that executes computer program at a time. However, since the teletext decoder A4 also contains a processor, the script decoder A5 is realized in reality by expanding the function of the teletext decoder A4 by way of software. In other words, the script decoder A5 is comprised of the teletext decoder A4 and a program ROM (not shown) and hence shares many circuits with the teletext decoder A4.

When the TV broadcasting station 12 transmits a program that viewers can participate by telephone, it typically inserts a set of supplementary program data including a script into the TV signals including video and audio signals of the program. A program production system for producing a set of data for a supplementary program including a script and inserting them into the proper program can be prepared by using a personal computer and a multiplexing device.

The TV broadcasting station 12 transmits a supplementary program is added to the proper program by inserting it into the channel of the latter. The computer program to be added to the proper program may be produced by the TV broadcasting station, the advertising agent 15 of the program or a third party such as a mail-order firm 16. The computer program produced by the TV broadcasting station may be prepared in advance or on a real time adhoc basis as in the case of broadcasting a live sports event.

A script typically has a configuration as described below.

A script is produced by the TV broadcasting station 12 and signals for it are transmitted with ordinary video and audio signals. A script is realized as a set of objects as listed below.

(1) background/displaying materials
(2) operational buttons
(3) a sequence of characters
(4) images Each of the objects may have a complementary procedure typically described by using an extended BASIC language, which includes control instructions for bidirectional telecommunications in addition to the ordinary BASIC language.

As a script is executed, firstly, the background of the scene and the elements that constitute the scene such as operational buttons are displayed. When the viewer selects one of the buttons and operates it, the program that corresponds to the button is started.

A processing procedure is registered in advance in the collector station 14 and the collected data may be distributed to the TV broadcasting station 12, the advertising agent 15, the program sponsor and the mail-order firm 16.

The following three types of bidirectional program can be realized by the above described bidirectional telecommunications system.

(1) supplementary data program capable of
 selecting and displaying additional information on the advertised commodities,
 selecting and displaying data for a live sports event,
 displaying a program summary,
 storing cooking recipes and displaying them later,
 responding to the answers to the questions posed on children in an educational program for children and
 responding to the answers from the viewers of a quiz show, (2) response feedback program (using a collector station 14) capable of
 carrying out a TV poll on social, economic and social issues,
 carrying out a TV poll on sports events and
 displaying statistics on correct answers and carrying out a tournament of viewers and (3) program having transactions (using a collector station 14) capable of
 receiving orders at a server (collector station 14) in a program for TV shopping,
 receiving requests for catalogs at a server (collector station 14) shown in TV ads and
 transmitting program viewing data for a survey on program viewing rates to a server (collector station 14) under the condition that the viewers consent to the survey.

FIGS. 2A and 2B illustrate a hybrid signaling system for transmitting teletext data and character transmission data to which this invention is applicable. More specifically, character transmission data are transmitted in the 14th H (the 277th H) through 16th H (the 279th H) and the 21th H (the 284th H) of a vertical blanking interval. Since the vertical blanking interval still has a space for data multiplexing, the 10th H (the 273th H) through the 13th H (the 276H) may be used for multiplexing the signals for a script.

The signals for a script may be multiplexed at positions different from those of the signals for the current character multiplexing or at the positions of the signals for the current character multiplexing on a time division basis. Alternatively, the signals for character transmission data may be transmitted through one of the sub-channels for audio multiplexing. In the latter case, the TV receiving set 11 picks up data from an FM reception section (not shown).

FIG. 3 schematically illustrates the configuration of a data packet of teletext and data transmission signals to which this invention is applicable and which are transmitted in a line period. A bit synchronizing code and a bit synchronizing code are arranged in front of the data packet. The data packet comprises a prefix, a data block and a check code. The prefix includes a service identification code and a packet control code. The service identification code is used to notify that the signals for a supplementary program have arrived.

Figure 4:
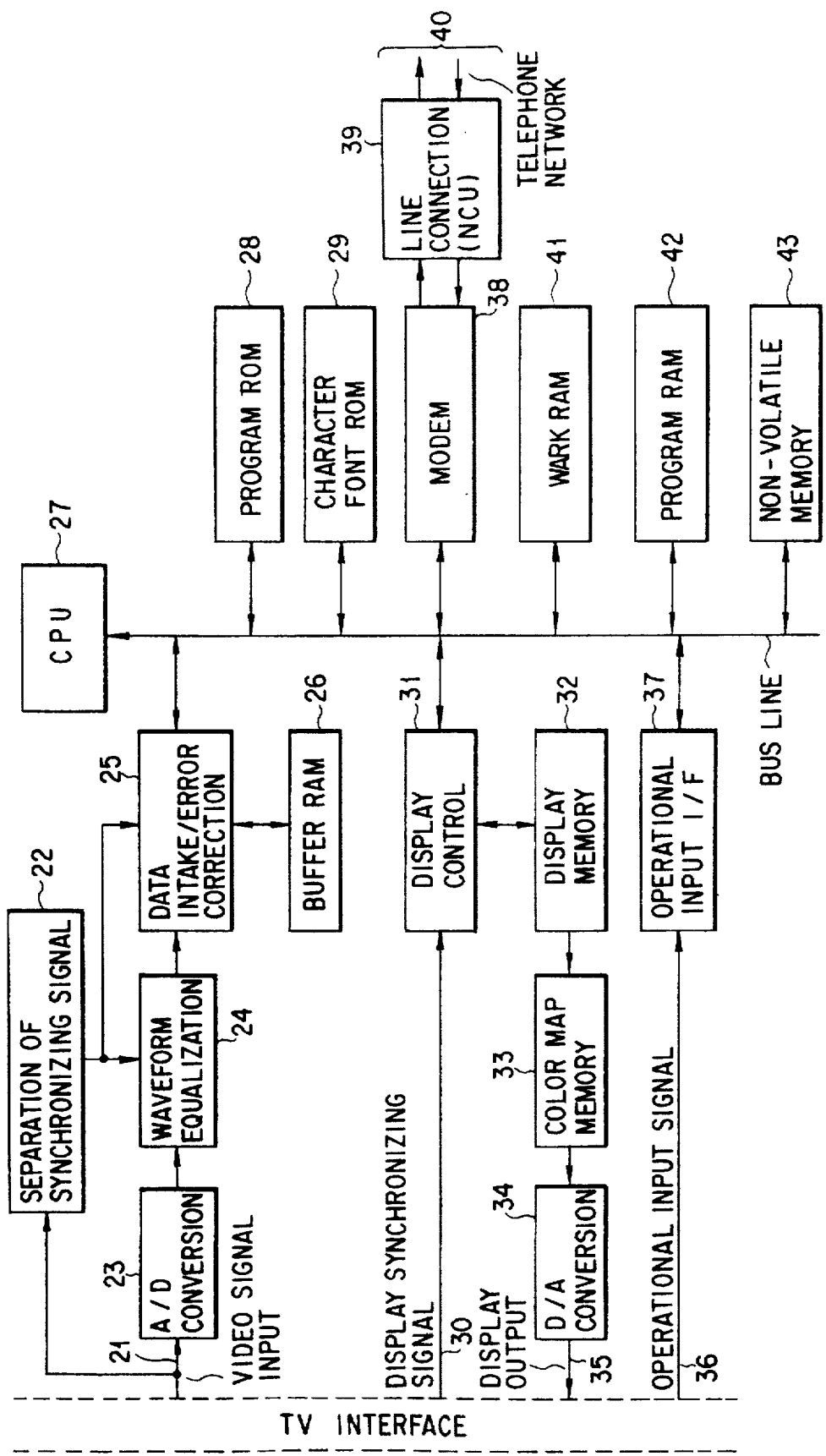
FIG. 4 is a block diagram of a teletext/data transmission decoder that can be used for an apparatus according to the invention.

FIG. 4 is a block diagram of a teletext/data transmission decoder that can be used in a TV receiving set 11 according to the invention. It include a bidirectional transmission device, a teletext decoder and a script decoder.

Video signals of a selected transmission channel are fed to a synchronizing signal separating section 22 and an A/D converter 23 through an input terminal 21. A signal for data for bidirectional digital telecommunications are multiplexed on a video signal in vertical blanking intervals. The data digitized by the A/D converter 23 are processed for waveform equalization by a waveform equalizing section 24 and then fed to a data intake/error correcting section 25.

The waveform equalizing section is designed to compensate the degradation of the digitized video signal that takes place in the transmission channel and separates the digital transmission signal multiplexed on the video signal. Then, it produces the multiplexing data and the clock contained in the separated signal. The data intake/error correcting section 25 takes the multiplexing data into a buffer 26 in synchronism with the clock by a unit of 8 bits.

CPU 27 operates on the basis of the fixed program stored in a program ROM 28. Character font ROM 29 stores character fonts to be used for displaying characters so that the CPU 27 addresses the desired characters and reads out character data for the ROM 29 corresponding to the addressed characters.

Input terminal 30 is fed with a synchronizing signal for synchronizing the signal of the supplementary program with that of the proper program of the TV receiving set. The synchronizing signal is then fed to a display control section 31. The display control section 31 reads out the data stored in display memory 32 in synchronism with the image being displayed on the screen of the TV receiving set and carries out an operation of writing the data to be displayed in the display memory 32 according to a write instruction from the CPU 27.

The data read out of the display memory 32 are then fed to color map memory 33. The color map memory 33 receives the address of the data to be displayed and produces the data for the levels of the RGB color signal corresponding to the address. The level data are then converted into an analog RGB signal by D/A converter 34 and fed out through the output terminal 35 of the circuit as a display signal.

The display signal is then synthetically combined with a TV video signal and displayed on the display screen (not shown) as an image obtained by superimposing a graphic on the image of the proper program. Depending on the interface of the display apparatus, the D/A converter 34 may be omitted and the RGB signal produced by the color map memory 33 may be directly produced as an output signal.

Input terminal 36 receives the operation signal keyed in by the viewer by means of the TV remote control. The operation signal is then taken into and analyzed by the CPU 27 by way of an operational input interface (I/F) 37.

Modem 38 comprises a modulator and a demodulator and operates as a telecommunications control section, which is connected to a telephone network 40 by way of a line connecting section 39. The line connecting section 39 operates to connect the circuit to and disconnect it from the telephone network 40 under the control of the CPU 27.

The CPU 27 is connected to the functional blocks including the data intake/error correcting section 25, the program ROM 28, the character font ROM 29, the operation input I/F 37, the display control section 31 and the modem 38 by way of a bus line. The bus line is also connected to a work RAM 41, a program RAM 42, a non-volatile memory 43 and other devices.

The program RAM 42 is a memory for storing the script (computer program) transmitted from the TV broadcasting station, which can be executed according to the input operation of the viewer by interpreting the script by means of the interpreter of the fixed program stored in ROM 28.

The non-volatile memory 43 stores an identification number (ID) specific to the receiving terminal (decoder), which is typically used for transmitting order data to the collector station 14 for television shopping. The collector station 14 can identify the order by recognizing the ID.

The above described circuit is used for teletext programs. As the viewer specifies a teletext program by operating the TV remote control, the CPU 27 comes under the control of the program stored in the program ROM 28 for teletext programs. Then, the transmitted character data are converted into display data by the character font ROM 29 and stored in the display memory 32 by way of the display control section 31.

Figure 5:
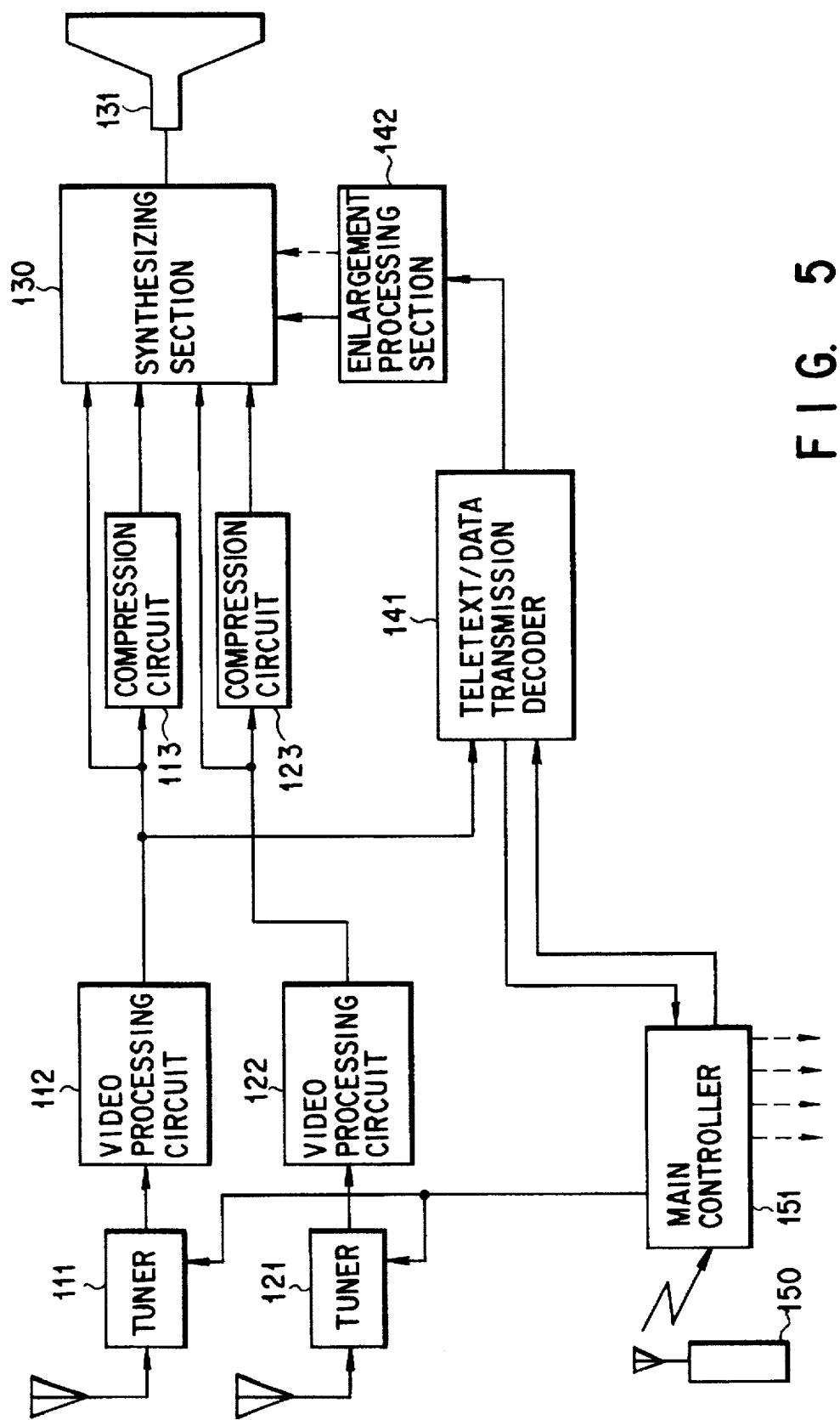
FIG. 5 is a block diagram of an embodiment of television receiving set having a text displaying feature according to the invention.

FIG. 5 is a block diagram of an embodiment of television receiving set according to the invention.

Referring to FIG. 5, the television signal received by tuner 111 is fed to a video processing circuit 112 and processed for detection and gamma correction. The video signal produced by the video processing circuit 112 is, if necessary, processed for image compression by a display image processing section 113. Synthesizing section 130 can selectively provides the compressed signal or the uncompressed video signal coming from the video processing circuit 112 according to a control signal.

The synthesizing section 130 synthetically combines its video signal with the signal coming from the teletext/data transmission decoder 141 and representing characters and graphics and produces the combined signals as its output. The output of the synthesizing section 130 is then fed to a display unit 131 which is comprised of a cathode ray tube. The teletext/data transmission decoder 141 has a configuration as described above by referring to FIG. 4 and operates to detect teletext signals and signals of a supplementary program contained in the output video signals of the video processing circuit 112.

The output of the teletext/data transmission decoder 141 can be fed to the synthesizing section 130 by way of an enlargement processing section 142 by the viewer operating a remote control unit.

A television receiving set according to the invention and having a configuration as described above operates in a manner as descried below. Note that the television receiving set has a wide screen with an aspect ratio of 16:9.

When the viewer specifies an A-channel display mode (for displaying only images for the signals received by tuner 111) by means of the remote control unit 150, the synthesizing section 130 directly selects the output of the video processing circuit 112 and feeds it to the display unit 131. In the A-channel display mode, teletext and/or data transmission signals may be added to the received signals. More specifically, the output of the teletext/data transmission decoder 141 is synthetically combined with the output video signal of the synthesizing section 130 by the latter to display characters and graphics including supplementary data.

If, on the other hand, the viewer operates the remote control unit 150 to specify a B-channel display mode (for displaying only images for the signals received by tuner 121) by controlling main controller 151, the synthesizing section 130 directly selects the output of the video processing circuit 122 and feeds it to the display unit 131. The main controller 151 and the synthesizing section 130 constitute a display status control means for displaying images in various different image displaying status, which will be described hereinafter.

If, finally, the viewer specifies both the A and B-channel display modes (for displaying images of the signals received by the tuners 111 and 121), the synthesizing section 130 alternately selects a horizontal line of the compressed image produced by the compression circuits 113 or 123 at the horizontal middle point of the screen. In other words, two images are simultaneously displayed on the screen of the display unit 131.

Figure 6A:
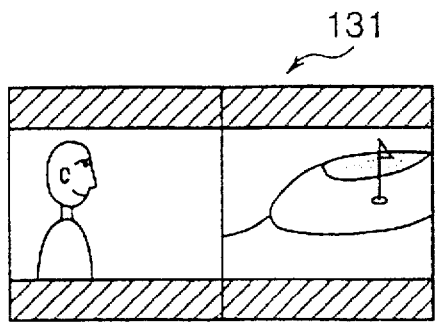
FIGS. 6A through 6F are views that can be displayed by the television receiving set of FIG. 5.

FIG. 6A illustrates images that can be simultaneously displayed on the screen of the embodiment. There, the image for the signal received by the tuner 111 is displayed on the left side of the screen, whereas the image for the signal received by the tuner 121 is displayed on the right side of the screen. If the left and right images are displayed with an aspect ratio of 4:3, upper and lower blank zones are produced on the screen. These zones are effectively utilized for the purpose of the invention.

Figure 6D:
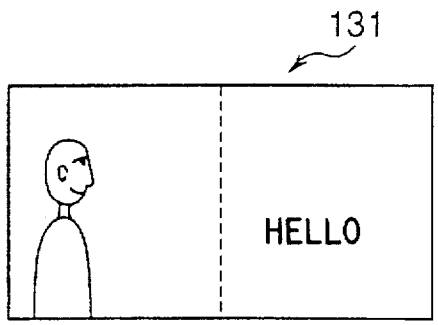
Figure 6B:
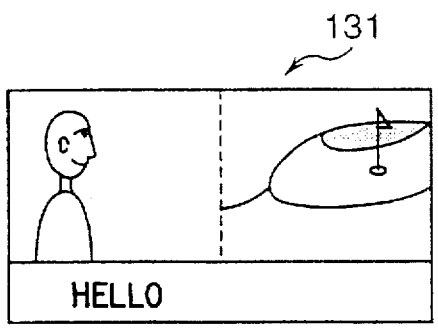
Figure 6E:
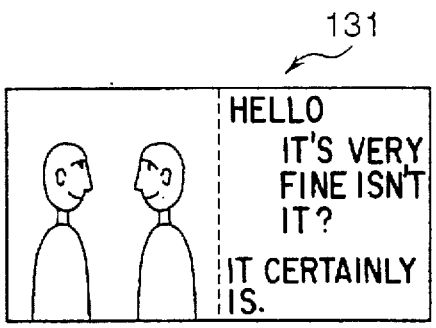
Figure 6C:
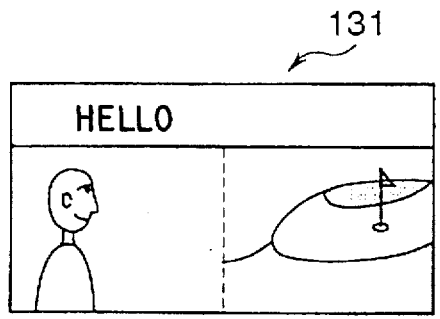

If the viewer operates the remote control unit 150 to specify the teletext/data transmission mode, images as shown either in FIG. 6B or in FIG. 6C may be obtained. In either case, the upper and lower blank zones are put together and placed either on the bottom or on the top of the screen to produce a wide margin for displaying characters and graphics simultaneously with the left and right side images. The timing for simultaneous display is controlled by mean of the synthesizing section 130 and compression processing sections 113, 123. This can be done by regulating the timing for vertically reading data.

Since the characters and graphics on the blank zone are linked with the left side image, the right side image may be erased to display them on the right side section as shown in FIGS. 6D and 6E. While characters and graphics in the right side section of FIG. 6D are displayed on a real time basis and only correspond to the image in the left side section, not only those corresponding to the left side image but also as many characters and graphics as possible including those corresponding to the past images may be displayed in the left side section as shown in FIG. 6E.

Thus, in the case of FIG. 6E, an image memory is used for characters and graphics and the contents of the image memory is controlled for updating so that the newest characters and graphics are added thereto and those that are oldest in the memory are erased. Note that characters and graphics are not displayed on the blank zone(s) because the timing of reading out characters and graphics in FIG. 6E is different from that of FIG. 6B or 6C. Alternatively, the blank zones may be totally wiped out by modifying the vertical compression ratio of the compression circuit.

Figure 6F:
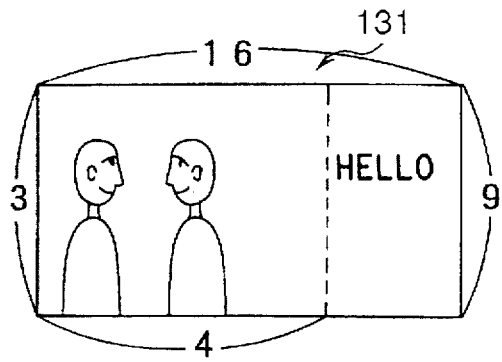

Still alternatively, the right side image may be made to occupy the largest possible area on the screen with the aspect ratio of 6:4 as shown in FIG. 6F, the remaining area of the screen being used for displaying characters and graphics.

The use of an image memory capable of storing data for characters and graphics to be displayed on the screen at a time provides various image displaying possibilities as will be described hereinafter.

FIG. 7A shows images that may be displayed on the screen. If the viewer specifies the teletext/data transmission mode by means of the remote control unit 150, an image of characters and graphics as shown in FIG. 7B may be displayed on the entire screen. If he or she then specifies a mixed mode of displaying both the proper program and the characters and graphics of the corresponding teletext/data transmission, images as shown in FIG. 7C may appear on the screen, where part of the characters and graphics being displayed are replaced by the images of the proper program, the remainder being displayed in the upper and lower blank zones.

This mixed display mode has the following advantage of showing a catch phrase and the program provider in the blank zones so that the viewer may be induced to select the teletext/data transmission mode to see the image of FIG. 7B if he or she is watching the proper program.

Additionally, the image memory for storing characters and graphics may be used in the following way.

That is, characters and graphics can be dimensionally enlarged or reduced at will. While FIG. 8A shows the ordinary font size for characters to be displayed in the blank zone, a larger or smaller font may be used for them as shown in FIG. 8B. Additionally, characters and graphics on the blank zones may be scrolled up or down for updating as shown in FIG. 8C.

The enlargement processing section 142 is typically be used for enlarging characters and graphics. Alternatively, the memory used for the compression circuit 123 may be used for enlarging characters and graphics in such a way that each image pixel data is read out twice for enlargement.

FIG. 9 is a block diagram of a synthesizing section 130 that can be used for the embodiment of FIG. 5.

The outputs of the compression circuits 113 and 123 are fed to respective input terminals of selector 321. The selector 321 is controlled by a switch signal YSS that is held to a high level when an output signal is applied to the selector 321 from the compression circuit 123 and, therefore, it select the output of the compression circuit 123 when the switch signal YSS is at the high level. The output of the selector 321 is fed to an RGB converter 322 and fed to the corresponding one of the input terminals of selector 323 as an RGB signal.

The other input terminal of the selector 323 receives the output of the teletext/data transmission decoder 141 and a control signal YS from a logic circuit 324 for the synthesizing timing.

FIGS. 10A and 10B show circuit diagrams that can be used for the logic circuit 324 of FIG. 9 to produce images of FIGS. 6B through 6F, FIG. 7C or FIGS. 8B and 8C, where characters are displayed in the blank zone(s).

Referring to FIG. 10A, control signal YST from the teletext/data transmission decoder 141 is fed to one of the input terminals of NAND-circuit 242 by way of an inverter 241, whereas controls signals YSS and YSH from the respective compression circuits 113 and 123 are fed to the other terminal of the NAND-circuit 242 by way of an OR-circuit 243 for obtaining a logical sum. With this circuit arrangement, the control signal YS produced by the NAND-circuit 242 goes to the high level when it receives an output of the teletext/data transmission decoder 141 while there are no image signals for the left and right sections of the screen so that characters may be displayed in the blank zone(s) as shown in FIGS. 6B through 6F, FIG. 7C and FIGS. 8A through 8C.

As described above by referring to FIGS. 7A through 7C, characters and graphics may be displayed on the entire screen or they may be partly wiped out selectively. This switching operation can be achieved by feeding the output of the NAND-circuit 242 to one of the input terminals of OR-circuit 244 and an ON/OFF control signal to the other input terminal of the OR-circuit 244 as shown in FIG. 10B. Images as shown in FIG. 7B may be obtained by constantly holding the signal YS to the high level.

FIG. 11 is a block diagram of an alternative synthesizing section 130 that can be used for the embodiment of FIG. 5.

Referring to FIG. 11, the output of the teletext/data transmission decoder 141 is converted into a brightness/color difference signal by a brightness/color difference converter 325 and the converted signal is fed to the compression circuit 123 by way of a selector 326.

With this arrangement, the right side section of the screen may be dedicated to displaying characters and graphics (FIGS. 6D, 6E and 6F). In this case, the control signal YS is forced to stay at a low level. Note that the image memory of the compression circuit 123 is effectively utilized.

Figure 12:
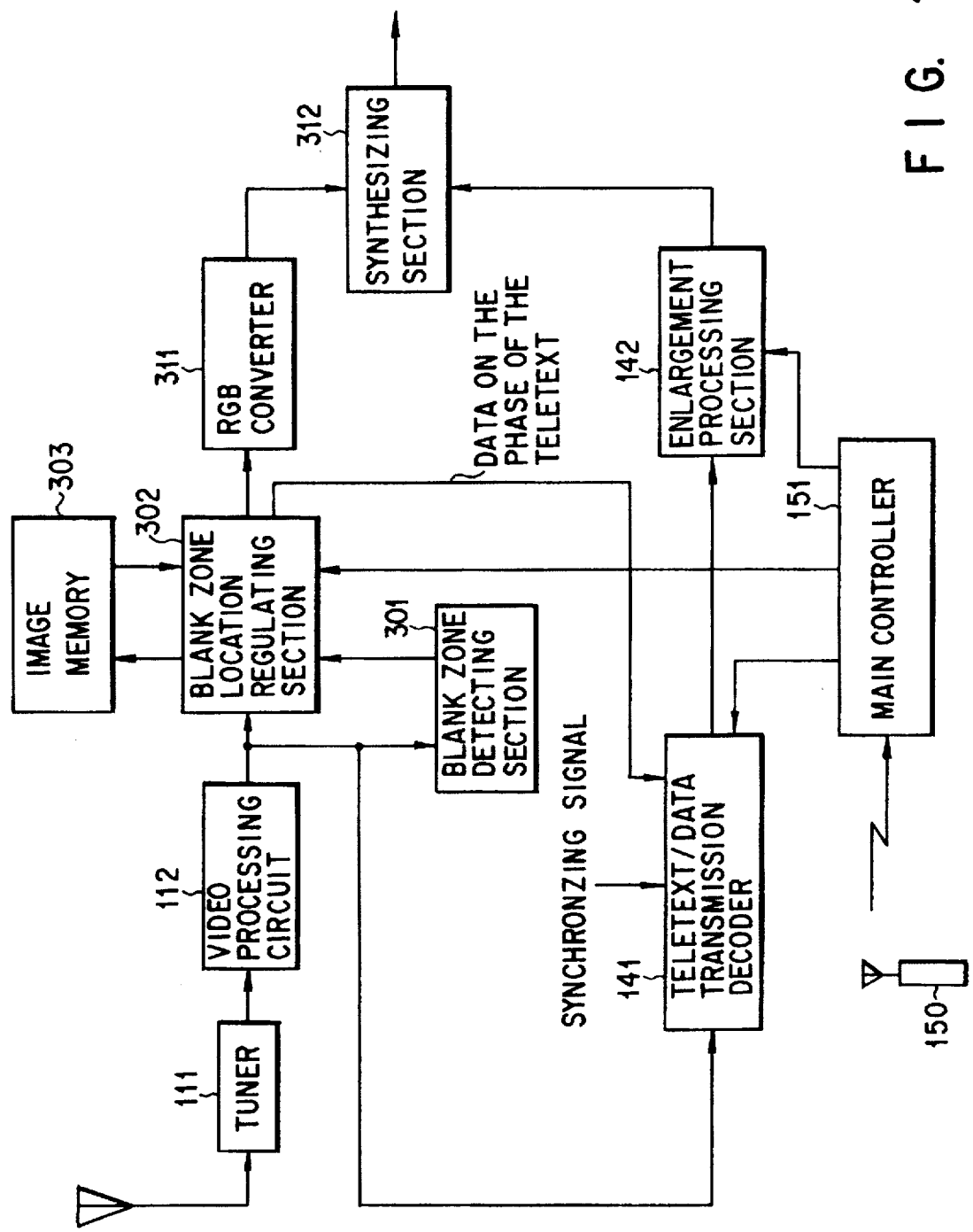
FIG. 12 is a block diagram of another embodiment of television receiving set according to the invention.

FIG. 12 is a block diagram of another embodiment of television receiving set according to the invention.

Referring to FIG. 12, the television signal received by tuner 111 is fed to a video processing circuit 112 and processed for detection and gamma correction. The video signal produced by the video processing circuit 112 is then fed to a teletext/data transmission decoder 141, a blank zone detecting section 301 and a blank zone location regulating section 302.

The blank zone location regulating section 302 detects a television signal in the letter box format (signal for providing upper and lower blank zones) and, if it receives a command for combining the upper and lower blank zones and placing them on the top or the bottom of the screen, positionally regulates the blank zones according to the command, using an image memory 303. The signal that has been subjected to this regulation (brightness/color difference signal) is converted into an RGB signal by an RGB converter 311 and then fed to an synthesizing section 312.

The synthesizing section 312 can synthetically combine the output signal of the RGB converter 311 and the signal from the teletext/data transmission decoder 141 that has or has not been processed for enlargement by an enlargement processing section 142. The output signal of the synthesizing section 312 is then fed to a display unit.

Figure 13A:
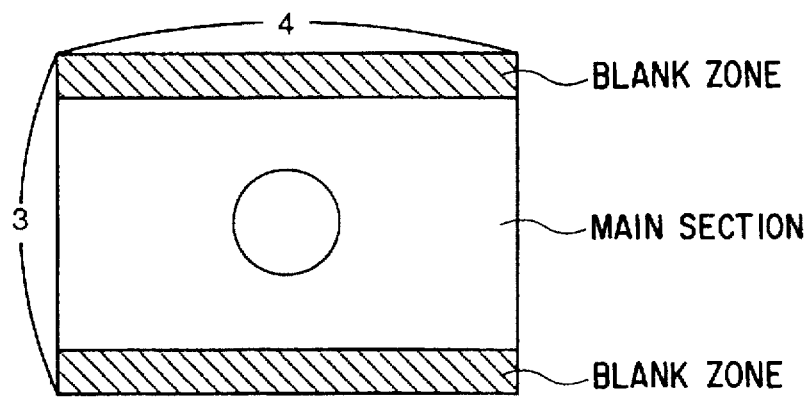
FIGS. 13A through 13D are views that can be displayed by the television receiving set of FIG. 12.

FIG. 13A is a view of the screen of a television receiving set according to the invention, having an aspect ratio of 4:3, when it receives a signal in the letter box format to produce upper and lower blank zones on the screen.

Figure 13B:
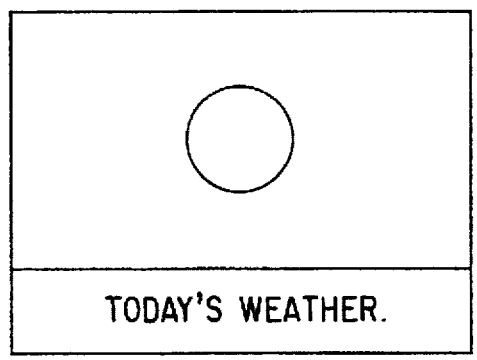
Figure 13C:
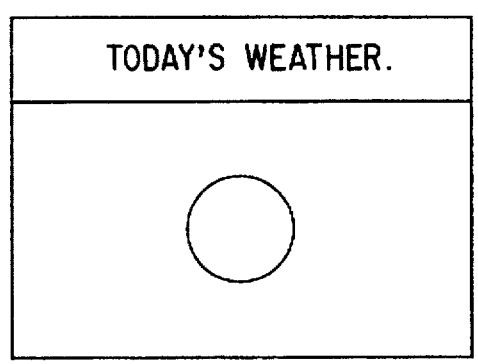
Figure 13D:
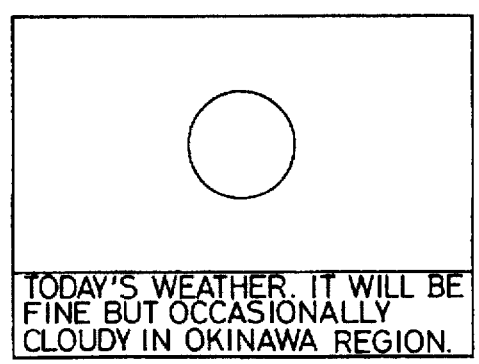

Assume that a weather forecast is being transmitted as a teletext and the viewer selects the ordinary teletext mode. Then, the upper and lower blank zones are put together and placed on the bottom of the screen to move the image of the proper program to the top as shown in FIG. 13D so that a plurality of character lines are displayed for the weather forecast in the unified blank zone. If the viewer selects a character enlarging mode, the characters are enlarged as shown in FIG. 13B. Then, the characters are scrolled laterally to show the full text. Alternatively, the unified teletext may be placed on the top of the screen to push down the image of the proper program.

To realize the above display, the teletext/data transmission decoder 141 receives data on the phase of the blank zone from the blank zone location regulating section 302 and determines the timing for producing the data on the characters and graphics to be displayed. More specifically, the CPU 27 shown in FIG. 4 receives a synchronizing signals for displaying images before it recognizes the current status of the screen and, at the same time, it also receives data on the phase of the blank zone to determine the timing for reading the data out of an output memory.

An interface is arranged so that the counted number of scanning lines is taken into the data on the phase. The timing for producing signals is determined on the basis of the counted number and the data on the current operational status (data concerning if the upper or lower position is specified for the blank zone) coming from the main controller 151. If the location of displaying characters is predetermined, the timing for producing signals may be determined solely on the basis of the data on the current operational status (data concerning if the upper or lower position is specified for the blank zone) coming from the main controller 151.

While characters are enlarged by the enlargement processing section 142 in the above embodiment, characters may alternatively be enlarged by controlling the deflected current of a deflection circuit.

Figure 14:
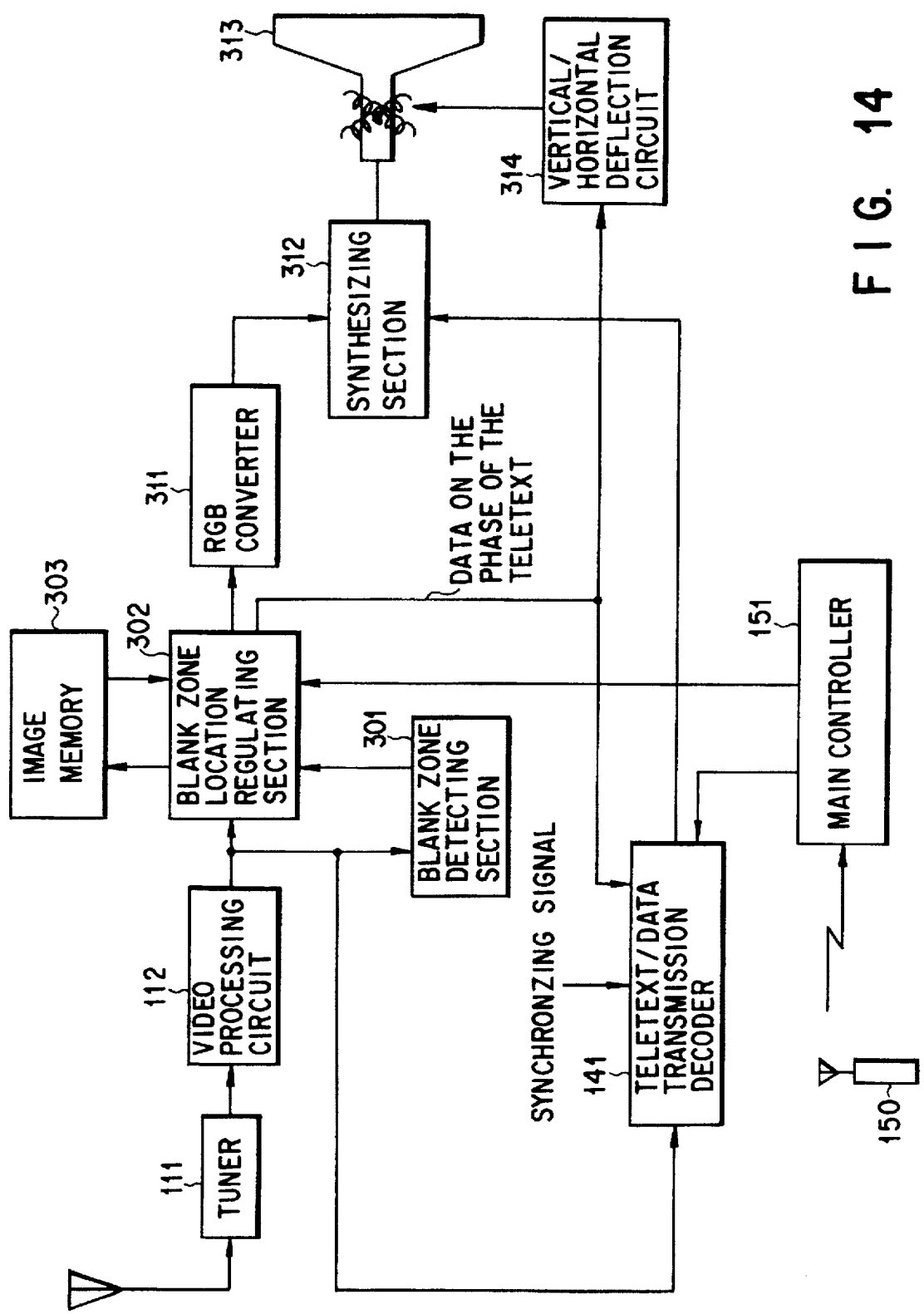
FIG. 14 is a block diagram of still another embodiment of television receiving set according to the invention.

FIG. 14 is a block diagram of still another embodiment of television receiving set according to the invention. Referring to FIG. 14, the signal from the synthesizing section 312 is fed to a cathode ray tube 313. The deflecting coil of the cathode ray tube 313 is fed with a deflected current from a vertical/horizontal deflection circuit 314. The characters being displayed on the blank zone are enlarged as shown in FIG. 13B or 13C by raising the changing rate of the deflected current in accordance with the timing of the operation of the blank zone.

As described above in detail, characters and graphics transmitted through a data channel can be displayed clearly to the viewer by ingeniously arranging the format of displaying characters and graphics in a supplementary program.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A television receiving set having a text displaying feature, comprising:

a signal receiving means including first and second tuners for receiving television signals simultaneously from two channels;

a first processing means for processing the signal received by said first tuner to produce a first video signal for displaying;

a second processing means for processing the signal received by said second tuner to produce a second video signal for displaying;

a decoding means for decoding data contained in said first video signal produced from said first processing means to obtain a restored signal; and display status controlling means for causing a display unit to display the image of the first video signal from said first processing means in either a predetermined left section or a predetermined right section of the screen of the unit, the image of the second video signal from said second processing means in the other predetermined section of the screen and the image of said restored signal from said decoding means in one or more than one blank zones of the screen where the images of said first and second video signals are not shown.

2. A television receiving set according to claim 1, wherein the screen of said display unit has an aspect ratio of 16:9.

3. A television receiving set according to claim 1, wherein said first and second processing means operates to produce a blank zone only at the bottom or the top of the screen by specifying a timing for vertically producing said respective first and second video signals.

4. A television receiving set according to claim 3, further comprising an enlargement processing means for processing the output signal of said decoding means for enlargement and feeding said output signal to said display status controlling means.

5. A television receiving set according to claim 1, wherein said display status controlling means further comprises a display controlling means for feeding the restored signal from said decoding means to either said first or said second processing means and causing the image of said restored signal to be displayed on the related section of the screen; said display status controlling means stopping the operation of displaying the image of said restored signal on said blank zone.

6. A television receiving set according to claim 1, wherein said decoding means produces data for characters and graphics to be displayed on the entire screen; and said display status controlling means is provided with a display switching means that operates to cause the images of the first and second video signals to be displayed on the screen with priority and only part of the characters and graphics for the entire screen to be displayed in said blank zone in a first operating state which causes characters and graphics for a single section of the screen to be displayed on the entire screen in a second operating state.

7. A television receiving set according to claim 6, wherein only the title of the characters and graphics for the single section of the screen is displayed in the blank zone.

8. A television receiving set according to claim 1, wherein only the provider of characters and graphics for a single section of the screen is displayed in the blank zone.

9. A television receiving set according to claim 1, wherein said display status controlling means further comprises a scrolling display controlling means for temporarily storing the restored signal from said decoding means and producing the restored signal for scrolling display on a first-in first-out basis.

10. A television receiving set having a text displaying feature, comprising:

a signal receiving means for receiving television signals;

a processing means for processing the signals received by said receiving means to produce a video signal for displaying;

a decoding means for decoding data contained in said video signal produced from said processing means to obtain a restored signal;

a blank zone detecting means for detecting if said video signal from said processing means produces upper and lower blank zones on a screen;

a blank zone location regulating means for regulating the vertical position of said video signal from said processing means to define a unified upper or lower blank zone when said blank zone detecting means detects a blank zone; and a synthesizing means for synthetically produces the image of the restored signal from said decoding means in correspondence to the blank zone of the output video signal produced by said blank zone location regulating means.

11. A television receiving set according to claim 10, further comprising an enlargement processing means for processing the output signal of said decoding means for enlargement.

12. A television receiving set according to claim 10, wherein said blank zone location regulating means provides data on the phase of the blank zone to a deflection circuit for feeding the deflecting coil of a display unit with an electric current in order to cause the display unit to display enlarged characters and graphics on said blank zone.

* * * * *